United States Patent [19]

Joullié et al.

[11] E Re. 29,256

[45] Reissued June 7, 1977

[54] DIGESTIVE PHARMACEUTICAL COMPOSITION COMPRISING S-CARBOXYMETHYL CYSTEINE FOR REDUCING VISCOSITY OF RESPIRATORY TRACT SECRETIONS, AND METHOD OF TREATING THEREWITH

[75] Inventors: Maurice L. Joullié, Yvelines; Gabriel Maillard, Paris; Lucien Lakah, Paris; Pierre Muller, Paris; Vu-Ngoc Huyen, Yvelines, all of France

[73] Assignee: Recherches Pharmaceutiques et Scientifiques, Paris, France

[22] Filed: June 2, 1976

[21] Appl. No.: 692,031

Related U.S. Patent Documents

Reissue of:

[64] Patent No.: 3,891,749
Issued: June 24, 1975
Appl. No.: 389,325
Filed: Aug. 17, 1973

U.S. Applications:

[63] Continuation of Ser. No. 10,999, Feb. 12, 1970, abandoned.

[30] Foreign Application Priority Data

Oct. 7, 1969 France ..... 69.34139

[52] U.S. Cl. ..... 424/311; 424/319
[51] Int. Cl.[2] ..... A61U 31/22; A61U 31/195
[58] Field of Search ..... 424/319, 311

[56] References Cited

FOREIGN PATENTS OR APPLICATIONS

| | | |
|---|---|---|
| 3,667 | 11/1965 | France |
| 964,989 | 7/1964 | United Kingdom |
| 1,114,313 | 5/1968 | United Kingdom |

*Primary Examiner*—Stanley J. Friedman
*Attorney, Agent, or Firm*—Gordon W. Hueschen

[57] ABSTRACT

S-carboxymethyl cysteine has been proposed for administration in nasal sprays, nasal drops or aerosols in otolyaryngology and in pneumology. When administered by the digestive route, this compound has the unexpected effect of reducing the viscosity of secretions of the respiratory tract. Administration to patients may be at a level of 1.5 to 3g per day in the form of a syrup, gelatine-coated pills or capsules, tablets or suppositories, in which other active materials, e.g., antibiotics, antihistamine drugs, corticoids or bronchodilators, may also be present.

18 Claims, No Drawings

DIGESTIVE PHARMACEUTICAL COMPOSITION COMPRISING S-CARBOXYMETHYL CYSTEINE FOR REDUCING VISCOSITY OF RESPIRATORY TRACT SECRETIONS, AND METHOD OF TREATING THEREWITH

Matter enclosed in heavy brackets [ ] appears in the original patent but forms no part of this reissue specification; matter printed in italics indicates the additions made by reissue.

This is a continuation of application Ser. No. 10,999, filed Feb. 12, 1970, now abandoned.

In British Pat. No. 964 989 of 26.7.61 there has been described a medicament which has S-carboxymethyl cysteine as its main active principle, and the presentation of this compound in the form of an aqueous solution which has been rendered isotonic or, if applicable, hypertonic to tears, for use in nasal sprays, nasal drops or aerosols.

The medicament has been indicated for use in otolaryngology and in pneumology.

The Applicant has now found that when S-carboxymethyl cysteine was administered by digestive route an effect was produced which could not be found when the product was administered by aerial route, namely an advantageous modification of the viscosity of the secretions of the respiratory tract.

When administered by aerial route in the form of a 10% aqueous solution to patients suffering from respiratory insufficiency, S-carboxymethyl cysteine considerably increases the volume of secretions but their viscosity (measured by the extent to which the two arms of forceps can be moved apart before the seromucous thread breaks) is not modified.

When studying 26 patients who received S-carboxymethyl cysteine by oral route, on the other hand, it was found that the reduction in the viscosity of the secretions became statistically significant from the third day, the gradient p, which is 0.005 on the second day, falling to 0.001 on the third day and staying at that value for the whole duration of the treatment. This lowering in the viscosity of the secretions seems to be associated with the appearance of a much richer secretion of salivary acid and salivary mucine.

A specific cellular localisation of transferases responsible for the synthesis of salivary glycosamine glycans has been demonstrated at the level of the mucous cells of the bronchial tree, and that of sulphotransferases in the serous acini of the mixed glands and in the caliciform cells.

One may therefore assume, without the invention being dependent on this explanation, that S-carboxymethyl cysteine acts selectively on the metabolism of the mucous elements. In bronchial disease, these mucous tubules are hypertrophied but generally only produce a mucine which is low in salivary acid. The action of S-carboxymethyl cysteine on the mucous producing hyperplasia would therefore be due to a process of activation of the salivary transferases, which would explain why this compound is only active when administered orally and does not have the same action when applied locally.

In any case, since S-carboxymethyl cysteine does not have to enter the body from the outside via a blocked up and deformed bronchial tree when administered by digestive route, it is absorbed with greater precision and regularity. Its action is therefore more constant and reliable, both in its tropic role and in its mucolytic power.

According to the present addition, S-carboxymethyl cysteine may be presented, for example, in the form of a syrup, gelatine coated pills or capsules, tablets or suppositories and, if applicable, in conjunction with other active principles, for example one or more representatives of the classes of antibiotics, antihistamine drugs, corticoids and bronchodilators.

The following non-restricting examples illustrate the presentation.

1. Syrups

| | |
|---|---|
| a) Syrup for infants: | |
| S-carboxymethyl cysteine | 2 g |
| Sugared and flavoured excipient q.s.p. | 100 ml |

The excipient consists of sucrose syrup to which a flavouring, a preservative and colouring have been added.

EXAMPLE 1

| | | |
|---|---|---|
| S-carboxymethyl cysteine | 2 | g |
| Sucrose | 70 | g |
| Methyl para-hydroxybenzoate (preservative) | 0.15 | g |
| Flavouring: Strawberry concentrate | 1 | ml |
| Cherry concentrate | 0.5 | ml |
| Vanillin | 0.05 | g |
| Red colouring | 0.005 | g |
| Sodium hydroxide q.s. for pH = 6.2 | | |
| Water q.s. for | 100 | ml |

In view of the insolubility of S-carboxymethyl cysteine, preparation of the syrup is started by neutralising S-carboxymethyl cysteine with sodium hydroxide to pH = 6.2. The other constituents are then added and the mixture is stirred and filtered.

| | |
|---|---|
| b) Syrup for adults: | |
| S-carboxymethyl cysteine | 5 g |
| Sugared and flavoured excipient q.s.p. | 100 ml |

EXAMPLE 2

| | | |
|---|---|---|
| S-carboxymethyl cysteine | 5 | g |
| Sucrose | 40 | g |
| Methyl para-hydroxybenzoate | 0.15 | g |
| Colouring: caramel | 0.10 | g |
| Flavouring: aromatic concentrate | 2 | ml |
| cinnamon essence | 0.002 | g |
| Sodium hydroxide q.s. for pH = 6.2 | | |
| Water q.s. for | 100 | ml |

The preparation is made up as in Example 1.

2. Gelatine and coated pills or capsules

Gelatine coated pills containing 50,100 or 250 mg of S-carboxymethyl cysteine may be prepared by simply mixing S-carboxymethyl cysteine with an excipient generally comprising lactose, a silica gel and magnesium stearate, and portioning out the doses using automatic machines.

EXAMPLE 1

| | |
|---|---|
| S-carboxymethyl cysteine | 0.050 g |
| Lactose | 0.040 g |
| Silica gel | 0.005 g |
| Magnesium stearate | 0.005 g |
| for one gelatine pill. | |

EXAMPLE 2

| | |
|---|---|
| S-carboxymeethyl cysteine | 0.250 g |
| Silica gel | 0.010 g |
| Magnesium stearate | 0.015 g |
| for one gelatine pill. | |

3. Tablets

Tablets containing different doses of S-carboxymethyl cysteine are prepared by conventional processes (preparation of a granular product, addition of a lubricant and compression on conventional machines).

EXAMPLE

| | |
|---|---|
| S-carboxymethyl cysteine | 0.100 g |
| Sucrose | 0.100 g |
| Starch | 0.045 g |
| Magnesium stearate | 0.005 g |
| for one tablet. | |

The tablets obtained may be used either plain or coated with sugar or any coating conventionally used in the manufacture of coated tablets.

4. Suppositories

Suppositories containing various doses of S-carboxymethyl cysteine may be prepared. For this purpose, S-carboxymethyl cysteine is mixed with an excipient for suppositories of the usual dosage, for example cocoa butter or Imhausen excipients.

EXAMPLE 1

| | |
|---|---|
| S-carboxymethyl cysteine | 0.100 g or 0.200 g or 0.500 g |
| Excipient q.s. for | 2 g |

Balsamic essences such as eucalyptol, camphor, etc. may be added to these suppositories.

EXAMPLE 2

| | |
|---|---|
| S-carboxymethyl cysteine | 0.500 g |
| Camphor | 0.060 g |
| Eucalyptol | 0.100 g |
| Excipient q.s. for | 2 g |

Various active principles which complement the action of S-carboxymethyl cysteine, for example antibiotics, anthistamine drugs, corticoids, and bronchodilators may be added to the above galenic preparations.

The non-restricting examples given below illustrate these possible combinations.

1. S-carboxymethyl cysteine + antibiotics:

| | |
|---|---|
| a) Gelatine coated pills | |
| a) S-carboxymethyl cysteine | 0.100 g |
| Tetracycline | 0.250 g |
| Excipient q.s.p. one pill | |
| b) S-carboxymethyl cysteine | 0.200 g |
| Chloramphenicol | 0.200 g |
| Excipient q.s.p. a pill made up to | 0.450 g |
| c) S-carboxymethyl cysteine | 0.100 g |
| Synthetic penicillin | 0.250 g |
| Excipient q.s.p. a pill made up to | 0.375 g |
| b) Syrups. | |

The combination S-carboxymethyl cysteine + antibiotic may be made up in the form of syrups which are reconstituted when used by the addition of a certain volume of water. A powder or granular preparation is made up which is put into phials.

EXAMPLE

| | |
|---|---|
| S-carboxymethyl cysteine | 2 g |
| Tetracycline (base) | 2.31 g |
| Sodium metabisulphite | 0.10 g |
| Sodium hexametaphosphate | 2 g |
| Methyl para-hydroxybenzoate sodium | 0.15 g |
| Sucrose | 67.6 g |
| Carboxymethyl cellulose | 0.15 g |

When the preparation is required to be used, sufficient water is added to obtain 100 ml. of syrup.

2. S-carboxymethyl cysteine + antihistaminics:

EXAMPLE 1

| | |
|---|---|
| Syrup S-carboxymethyl cysteine + promethazine | |
| S-carboxymethyl cysteine | 2 g or 5 g |
| Promethazine | 0.05 g or 0.10 g |
| Sugared and flavoured excipient q.s.p. | 100 ml |

The excipient may consist of a coloured and flavoured sugar syrup, for example as follows:

| | |
|---|---|
| Sucrose | 50 to 70 g |
| Methyl para-hydroxybenzoate | 0.10 g |
| Cocoa flavour | 0.5 ml |
| Vanillin | 0.025 g |
| Colouring (tartrazine) | 0.0005 g |
| Water q.s.p. | 100 ml |

EXAMPLE 2

| | |
|---|---|
| Tablets S-carboxymethyl cysteine + diphenhydramine | |
| S-carboxymethyl cysteine | 0.200 g to 0.500 g |
| Diphenhydramine hydrochloride | 0.025 to 0.050 g |
| Excipient q.s.p. a tablet weighing | 0.300 to 0.650 g |

3. S-carboxymethyl cysteine + corticoids

S-carboxymethyl cysteine may be combined with various corticoids such as hydrocortisone or prednisone in the form of tablets.

EXAMPLE

| | |
|---|---|
| S-carboxymethyl cysteine | 0.200 g to 0.500 g |
| Prednisone | 0.001 g to 0.005 g |
| Excipient q.s.p. a tablet weighing | 0.275 to 0.600 g |

The excipient may consist of a conventional mixture which may contain lactose or sucrose, starch as disintegrating agent and a lubricant such as stearic acid or magnesium stearate. The tablets are manufactured by conventional processes.

4. S-carboxymethyl cysteine + bronchodilators

The combined drug may be made up in the form of suppositories, tablets or gelatine coated pills.

EXAMPLE

| | |
|---|---|
| Suppositories: | |
| S-carboxymethyl cysteine | 0.500 g |
| Theophylline | 0.300 g |
| Excipient for suppositories q.s. for | 2 g |
| Tablets or gelatine coated pills: | |
| S-carboxymethyl cysteine | 0.400 g |
| Theophylline | 0.050 g |
| Excipient q.s. for a tablet weighing | 0.600 g |
| or for a pill made up to | 0.475 g |

The tablets may be plain or coated by conventional methods.

Double centred tablets in which theophylline is coated with a gastro-resistant varnish may also be prepared. In such a formula, a small tablet of theophylline is first prepared which is coated with a varnish such as gum lac. This tablet constitutes the centre of a larger tablet made up of S-carboxymethyl cysteine and an excipient.

The daily dosage may be on an average 1.5 to 3 g S-carboxymethyl cysteine.

We claim:

[1. A pharmaceutical preparation in dosage unit form, adapted for administration by the digestive route for the reduction of viscosity of secretions of the respiratory tract, selected from the group consisting of a suppository, syrup, pill, capsule, or tablet and comprising, per dosage unit, an effective amount of S-carboxymethyl cysteine to accomplish said reduction, and a pharmaceutical diluent.]

2. The preparation of claim [1,] *19*, wherein said dosage unit is based upon a daily dosage of from about 1.5 to 3 grams of S-carboxymethyl cysteine.

3. A preparation of claim [1] *19* which is a suppository.

4. A preparation of claim [1] *19* which is adapted for oral administration.

5. A preparation of claim 1 which includes at least one member selected from the group consisting of antibiotics, antihistamine drugs, corticoids and bronchodilators.

[6. A mucolytic pharmaeceutical composition, for the reduction of viscosity of secretions of the respiratory tract, in dosage unit form, comprising, per dosage unit, S-carboxymethyl cysteine (S-CMC) in a mucolytically effective amount together with a pharmaceutical diluent, said pharmaceutical dosage form being an oral dosage form.]

7. A method of reducing a viscosity of secretions of the respiratory tract, which comprises administering to a patient an effective amount of S-carboxymethyl cysteine, by the digestive route, in a form selected from the group consisting of a suppository, syrup, pill, capsule, or tablet.

8. The method of claim 7, wherein the daily dosage is from 1.5 to 3 grams.

9. The method of claim 7, wherein the S-carboxymethyl cysteine is administered as a suppository.

10. The method of claim 7, wherein said S-carboxymethyl cysteine is administered orally.

11. The method of claim 7, wherein said S-carboxymethyl cysteine is administered with at least one member selected from the group consisting of antibiotics, antihistamine drugs, corticoids and bronchodilators.

12. A method of reducing the viscosity of secretions of the respiratory tract, with comprises administering to a patient an effective amount of S-carboxymethyl cysteine, by the digestive route, said effective amount being a daily dosage of at least 1.5 grams.

13. The method of claim 12, wherein the daily dosage is 1.5 to 3 grams.

14. The method of claim 12, wherein the dosage is administered orally.

*15. The preparation of claim 19, wherein said unit dosage form is based upon a daily dosage of at least 1.5 grams.*

*16. The preparation of claim 20, wherein said unit dosage form is based upon a daily dosage of at least 1.5 grams.*

*17. The preparation of claim 15, containing about .2 to .5 gram per dosage unit.*

*18. The preparation of claim 16, containing about .2 to .5 gram per dosage unit.*

*19. A pharmaceutical preparation in dosage unit form adapted for administration by the digestive route and for the reduction of viscosity of secretions of the respiratory tract, selected from the group consisting of a suppository, syrup, pill, capsule, or tablet and comprising, per dosage unit, an effective amount of S-carboxymethyl cysteine to accomplish said reduction, and a pharmaceutical diluent.*

*20. A mucolytic pharmaceutical composition for the reduction of viscosity of secretions of the respiratory tract, in dosage unit form and comprising, per dosage unit, S-carboxymethyl cysteine (S-CMC) in a mucolytically effective amount together with a pharmaceutical diluent, said pharmaceutical dosage form being an oral dosage form.*

* * * * *

UNITED STATES PATENT OFFICE

CERTIFICATE OF CORRECTION

Patent No. Re 29,256 Dated June 7, 1977

Inventor(s) Maurice L. Joullie et al.

It is certified that error appears in the above-identified patent and that said Letters Patent are hereby corrected as shown below:

Col (73) Name of Assignee ; Change "Recherches" to read ---Recherche---

Col. 2, Line 54; Change "Gelatine and coated" to read ---Gelatine coated---

Col. 3, Line 48; Change "anthistamine drugs" to read ---antihistamine drugs,---

Col. 5, Line 25; Change "claim 1" to read ---claim 19---

Signed and Sealed this

*Thirteenth* Day of *September 1977*

[SEAL]

*Attest:*

RUTH C. MASON
*Attesting Officer*

LUTRELLE F. PARKER
*Acting Commissioner of Patents and Trademarks*